US012720662B2

(12) United States Patent
Kim

(10) Patent No.: US 12,720,662 B2
(45) Date of Patent: Aug. 25, 2026

(54) LIGHTING ADDRESS CONFIGURATION SYSTEM USING VISIBLE LIGHT COMMUNICATION

(71) Applicant: UNILUX INC., Gyeonggi-do (KR)

(72) Inventor: Jung Ho Kim, Seoul (KR)

(73) Assignee: UNILUX INC., Gyeonggi-do (KR)

( * ) Notice: Subject to any disclaimer, the term of this patent is extended or adjusted under 35 U.S.C. 154(b) by 189 days.

(21) Appl. No.: 18/836,586

(22) PCT Filed: Oct. 5, 2023

(86) PCT No.: PCT/KR2023/015330
§ 371 (c)(1),
(2) Date: Jan. 18, 2025

(87) PCT Pub. No.: WO2024/096346
PCT Pub. Date: May 10, 2024

(65) Prior Publication Data
US 2025/0380347 A1 Dec. 11, 2025

(30) Foreign Application Priority Data
Nov. 4, 2022 (KR) ........................ 10-2022-0146408

(51) Int. Cl.
*H05B 47/195* (2020.01)
*H05B 47/175* (2020.01)

(52) U.S. Cl.
CPC ......... *H05B 47/195* (2020.01); *H05B 47/198* (2024.01)

(58) Field of Classification Search
CPC .... H05B 47/195; H05B 47/198; H05B 47/10; H04L 61/5038; H04L 61/5092; H04B 10/116
See application file for complete search history.

(56) References Cited

U.S. PATENT DOCUMENTS

| | | | | |
|---|---|---|---|---|
| 7,577,836 | B2 * | 8/2009 | Puranik | H04L 63/062 455/410 |
| 11,388,570 | B2 * | 7/2022 | Economy | H04W 4/70 |
| 11,412,603 | B2 * | 8/2022 | Economy | H04B 10/40 |
| 12,075,543 | B2 * | 8/2024 | Barna | H05B 47/16 |
| 12,438,961 | B2 * | 10/2025 | Buys | H04L 69/26 |
| 2006/0171387 | A1 * | 8/2006 | Kang | H04L 61/5046 370/389 |
| 2009/0089293 | A1 * | 4/2009 | Garritano | G06F 16/358 |

(Continued)

FOREIGN PATENT DOCUMENTS

| | | | |
|---|---|---|---|
| JP | 2002-289373 | A | 10/2002 |
| JP | 2010-129223 | A | 6/2010 |

(Continued)

*Primary Examiner* — Adam D Houston
(74) *Attorney, Agent, or Firm* — IP Legal Services, LLC

(57) ABSTRACT

The present invention relates to a lighting address configuration system using visible light communication, which may allow direct configuration of a desired address under a lighting for which an address is desired to be configured after installing the lighting by using visible light generated by blinking of the corresponding lighting, improve a recognition rate of a visible light signal according to blinking of the light, and improve quality by greatly reducing a possibility of duplication when issuing random numbers for address configuration.

5 Claims, 6 Drawing Sheets

(56) References Cited

U.S. PATENT DOCUMENTS

| | | | | |
|---|---|---|---|---|
| 2012/0043889 | A1* | 2/2012 | Recker | H05B 47/19<br>315/86 |
| 2012/0091910 | A1* | 4/2012 | Zhang | H05B 45/3725<br>315/287 |
| 2012/0250831 | A1* | 10/2012 | Gorecki, Jr. | H04N 21/6137<br>379/90.01 |
| 2012/0299480 | A1* | 11/2012 | Peting | H05B 47/185<br>315/185 R |
| 2014/0186049 | A1* | 7/2014 | Oshima | H04N 25/531<br>398/118 |
| 2014/0265880 | A1* | 9/2014 | Taipale | H05B 47/11<br>315/246 |
| 2014/0265897 | A1* | 9/2014 | Taipale | H02J 13/14<br>363/126 |
| 2017/0223807 | A1* | 8/2017 | Recker | H02J 9/02 |
| 2018/0212684 | A1* | 7/2018 | Aoyama | G06F 3/04845 |
| 2025/0380347 | A1* | 12/2025 | Kim | H04L 61/5038 |

FOREIGN PATENT DOCUMENTS

| | | | | | |
|---|---|---|---|---|---|
| JP | 2022518192 | A | * | 3/2022 | H05B 47/195 |
| KR | 10-0670490 | B1 | | 1/2007 | |
| KR | 10-2014-0098570 | A | | 8/2014 | |
| KR | 10-1756336 | B1 | | 7/2017 | |
| KR | 20240155477 | A | * | 10/2024 | H04L 9/50 |
| WO | WO-2010111250 | A1 | * | 9/2010 | G01J 1/0233 |
| WO | WO-2014154274 | A1 | * | 10/2014 | H05B 41/3921 |
| WO | WO-2015001472 | A1 | * | 1/2015 | H05B 47/16 |
| WO | WO-2018053369 | A1 | * | 3/2018 | H05B 47/199 |
| WO | WO-2020144481 | A1 | * | 7/2020 | H05B 47/19 |
| WO | WO-2024096346 | A1 | * | 5/2024 | H05B 47/198 |

* cited by examiner

LIGHTING ADDRESS CONFIGURATION SYSTEM USING VISIBLE LIGHT COMMUNICATION

CROSS REFERENCE TO RELATED APPLICATIONS

This application is a National Stage Patent Application of PCT International Patent Application No. PCT/KR2023/015330 (filed on Oct. 5, 2023) under 35 U.S.C. § 371, which claims priority to Korean Patent Application No. 10-2022-0146408 (filed on Nov. 4, 2022), the teachings of which are incorporated herein in their entireties by reference.

TECHNICAL FIELD

The present disclosure relates to a lighting address configuration system using visible light communication, and more particularly, to a lighting address configuration system using visible light communication, the lighting address configuration system which may allow direct configuration of a desired address for a lighting lamp under the lighting lamp for which an address is to be configured using visible light generated by blinking of the corresponding lighting lamp after installing the lighting lamp, increase a recognition rate of a visible light signal according to blinking of the lighting lamp, and improve quality by greatly reducing a possibility of duplication when issuing random numbers for address configuration.

BACKGROUND ART

Until now, most lighting control methods have used relays to turn light on/off in units of a certain group. However, with the introduction of LEDs capable of easily performing dimming/toning compared to lighting lamps in the related art, there is an increasing demand for energy saving using interoperation of sensors, as well as an increasing need to individually control lighting lamps to create a light environment effective for a purpose of use of a space such as emotional lighting.

All lighting lamps need to have a unique address to individually control the lighting lamps, and a control device issues a control signal for a corresponding address to perform control.

That is, a means for configuring a unique address for a lighting lamp is essentially needed, and a method of using the means needs to be simple and incorrect configuration needs to be prevented.

Generally, a switch is physically connected to control power of a lighting lamp. However, in a lighting control system having a unique address, a desired lighting lamp may be freely designated to each button of a switch, and work for designating a lighting lamp to a button is necessary. To do so, it is desirable to be able to freely configure an address by specifying a lighting lamp.

Since an address needs to be included in all communications, when a length of the address is long, a communication speed may slow down and a possibility of occurrence of errors increases, and thus, 6 bits are generally used. That is, an address space is in a range from 0 to 63.

A physical location of a lighting lamp cannot be specified only using electrical means. Accordingly, in the related art, a dip switch is equipped in each lighting lamp and an address is configured using the dip switch before installation, or an address of each lighting lamp is configured in advance at the time of shipment and indicated on an installation drawing so that a lighting lamp having the address indicated on the installation drawing is found and attached to a designated location during installation.

However, this method needs a lot of installation time, and when configuration is incorrectly performed, the lighting lamp needs to be separated from a ceiling to perform rework.

In a case of a digital addressable lighting interface (DALI) system which is a most widely used lighting control system, lighting lamps are requested to automatically generate 3 bytes, that is, a number from 0 to 16, 777, 215, and the generated numbers are searched for to sequentially designate addresses of 0 to 63 to be actually used for the lighting lamps.

It takes a considerable amount of time to search for lighting lamps using the numbers from 0 to 16, 777, 215 which can be expressed as a data length of 3 bytes at a communication speed of 1200 bps (DALI's communication speed is 1200 bps). Particularly, even when a lighting lamp is found, a physical location of the lighting lamp is not known, and a means to specify the physical location is not present. In addition, an address is randomly designated regardless of the physical location.

A desired lighting lamp needs to be designated to a program switch to perform actual control. However, since the designation of an address is performed at random, after addresses are designated to lighting lamps, the lighting lamps need to be turned on sequentially in an order of the addresses to check the lighting lamps corresponding to the addresses. Further, addresses cannot be distributed according to spaces.

Additionally, since an address of a lighting lamp is not determined at design time, setting of a program switch, etc. cannot be performed in advance.

Accordingly, after a whole lighting control systems is installed, addresses are designated to lighting lamps. Then, the program switches need to be designated to the lighting lamps after checking the addresses of the lighting lamps.

Another address configuration method is to equip an infrared (IR) receiving unit in a lighting lamp and configure a desired address for a lighting lamp using a device which allows an IR signal to reach only the lighting lamp. However, to do so, the lighting lamp needs to be equipped with an IR receiving unit used only for address configuration, and thus, it is difficult to generalize this method. In addition, a cost is increased, installation of the IR receiving unit may be difficult depending on an equipment design.

Accordingly, to solve this problem, Korea Patent Publication 10-1756336 (Address configuration system of lighting fixture) (hereinafter referred to as a 'prior art') proposed by the present applicant has been disclosed.

The prior art discloses a lighting control system providing a convenience of, after installation of lighting fixtures, easily configuring a desired address for a desired lighting fixture under the corresponding lighting fixture using a movable address configuration element, as well as producing and installing the light fixtures without having to take into account addresses during the installation of the lighting fixtures at production and installation sites, thereby leading to an operational effect of enhancing productivity and workability.

However, in the prior art described above, there is a problem in that recognition of a blinking lighting lamp signal, that is, a visible light signal according to a length of a light-on or light-off section may be inaccurate when an address is configured. In addition, when random numbers for address configuration are issued, overlapping of random numbers may theoretically occur.

DISCLOSURE OF INVENTION

Technical Problem

Therefore, the present invention has been made in view of the above problems, and it is an object of the present invention to provide a lighting address configuration system using visible light communication, the lighting address configuration system which may allow direct configuration of a desired address under a lighting lamp for which an address is to be configured using visible light generated by blinking of the lighting lamp after installation of the lighting lamp, increase a recognition rate of a visible light signal according to blinking of a lighting lamp, and improve quality by greatly reducing a possibility of duplication when issuing random numbers for address configuration.

Another object of the present invention is to provide a lighting address configuration system using visual light communication, the lighting address configuration system being configured to designate a lighting lamp having a particular address to generate a random number and issue a command for performing a blinking operation corresponding to the random number to reduce a number of lighting lamps to be maintained during the maintenance, prevent such inconvenience that all lighting lamps unnecessarily blink at the same time, and reduce a probability of duplication of random numbers.

Technical Solution

To accomplish the above object, according to one aspect of the present disclosure, there is provided a lighting address configuration system using visual light communication, the lighting address configuration system including: a lighting control unit configured to relay and transmit, to a lighting lamp unit, an address configuration command for configurating an address of the lighting lamp unit, the address configuration command being received from an address configuration device; the lighting lamp unit configured to: receive the address configuration command from the lighting control unit and perform control corresponding to the address configuration command; and with respect to the address configuration command, perform a blinking operation corresponding to parameter calibration data by reflecting parameter setting information when a first command is received, perform a blinking operation corresponding to a currently configured address value when a second command is received, generate a random number and perform a blinking operation corresponding to the generated random number when a third command is received, and determine whether a designated random number is a random number issued by the lighting lamp unit when the fourth command is received, and when the designated random number is the random number issued by the lighting lamp unit, perform an operation of configuring a particular address input as an address of the lighting lamp unit; a visible light receiving device configured as a movable portable device, located near and below a desired lighting lamp unit, and configured to receive visible light when the desired lighting lamp unit is blinking, signal-process the visible light, and transmit the signal-processed visible light to an address transmission device; and the address configuration device configured as a movable portable device, configured to communicate with the lighting control unit and the visible light receiving device, transmit a command to the visible light receiving device to enter a calibration data receiving mode, an address receiving mode, or a random number receiving mode, and transmit an address configuration command to the lighting control unit, wherein the address configuration command is controlled to include a first command, a second command, a third command, and a fourth command, the first command requesting the lighting lamp unit to perform a blinking operation corresponding to parameter calibration data by transmitting information needed to set a parameter, the second command requesting all lighting lamp units to perform a blinking operation in correspondence with a currently configured address value, the third command requesting all the lighting lamp units to generate a random number and perform a blinking operation in correspondence with the generated random number, and the fourth command requesting to designate a received particular random number and configure a particular address for a lighting lamp unit that issued the received particular random number.

In addition, according to the present disclosure, the address configuration command may further include a fifth command for designating a lighting lamp unit having a particular address to generate a random number and perform a blinking operation in correspondence with the random number.

In addition, according to the present disclosure, a parameter set when the lighting lamp unit performs a blinking operation may be a length of a start bit light-on section, a length of a start bit light-off section, a length of a light-on section when data is '1,' a length of a light-off section when data is '1,' a length of a light-on section when data is '0,' a length of a light-off section when data is '0,' and a length of a light-on section in an end-bit section.

In addition, according to the present disclosure, a random number issued by the lighting lamp unit may be generated by, when analog values such as a length of a certain section or a voltage is converted into digital values, combining lowest-order binary digits (0 or 1) of values obtained by the conversion to have a certain length.

In addition, according to the present disclosure, the visible light receiving device include: a waveguide configured to, when the visible light receiving device is located near and below the lighting lamp unit, receive only a blinking signal of the lighting lamp unit and block light from other lighting lamp units; a light receiving unit configured to receive visible light introduced into the waveguide and input the received visible light to a third control unit; and a third control unit configured to receive an input of a signal of the visible light through the light receiving unit and transmit the signal of the visible light to the address configuration device through a fourth communication unit, wherein whether communication is successful is determined by measuring a length of actual blinking according to a value set separately from a value set for a parameter.

Advantageous Effects

As described above, the present disclosure provides an advantage of allowing direct configuration of a desired address under a lighting lamp for which an address is to be configured using visible light generated by blinking of the corresponding lighting lamp after installing the lighting lamp, increasing a recognition rate of a visible light signal according to blinking of the lighting lamp, and improving quality by greatly reducing a possibility of duplication when issuing random numbers for address configuration.

In addition, the present disclosure provides advantages of reducing a number of lighting lamps to be maintained during the maintenance, preventing such inconvenience that all lighting lamps unnecessarily blink at the same time, and reducing a probability of duplication of random numbers by designating a lighting lamp having a particular address to generate a random number, and issuing a command for performing a blinking operation corresponding to the random number.

In addition, the present disclosure allows configuration of a desired address for a lighting lamp under the lighting lamp for which an address is to be configured using a movable address configuration device after installing the lighting lamp, thereby providing an advantage of convenient address configuration.

In addition, the present disclosure may fundamentally solve all problems that may occur when it takes a long time to configure an address and an address is configured at random, like in a case of a digital addressable lighting interface (DALI) system which is a mainstream in a global lighting market.

Additionally, in the present disclosure, time for configuring an address for a lighting lamp may be greatly reduced, and a relationship between switches and lighting lamps may be finished during design, which is very effective compared to a method disclosed in the related art in which configuration of addresses for lighting lamps is finished after installation, and then, addresses according to positions of the lighting lamps are individually identified, then, assigned to switches.

BEST MODE FOR CARRYING OUT THE INVENTION

Figure 1:
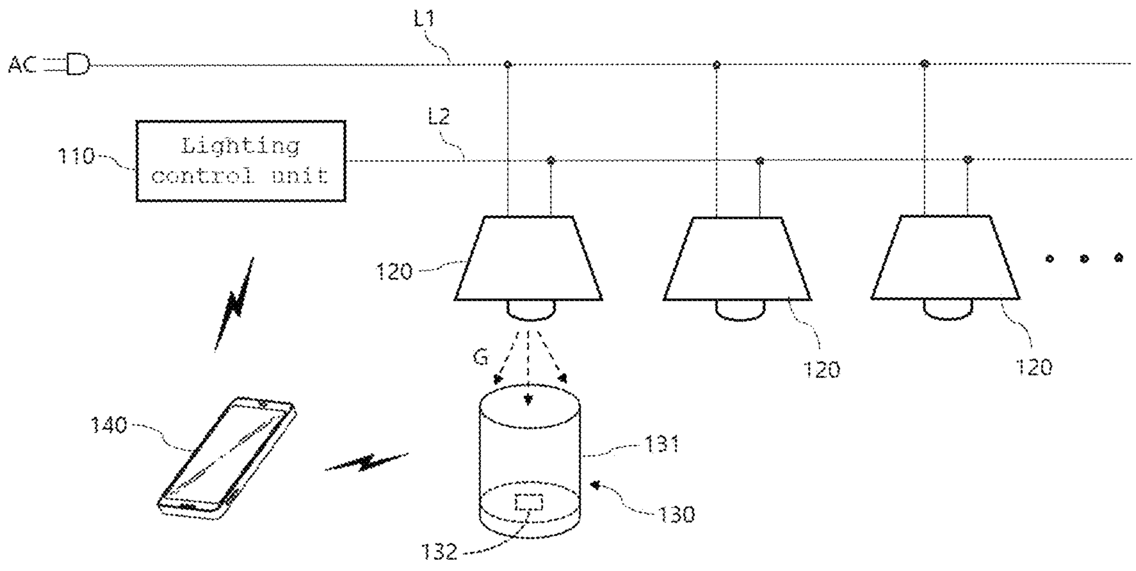
FIG. 1 is a configuration diagram of a lighting address configuration system using visible light communication according to an embodiment of the present disclosure.

Hereinafter, exemplary embodiments of the present disclosure are described in detail with reference to the accompanying drawings.

It should be noted that when reference numerals are added to elements in respective drawings, like reference numerals in the drawings are given to like elements as possible, even if they are shown in different drawings. In the description of the present disclosure, certain detailed explanations of functions or configurations are omitted when it is deemed that they may unnecessarily obscure the essence of the present disclosure.

Figure 2:
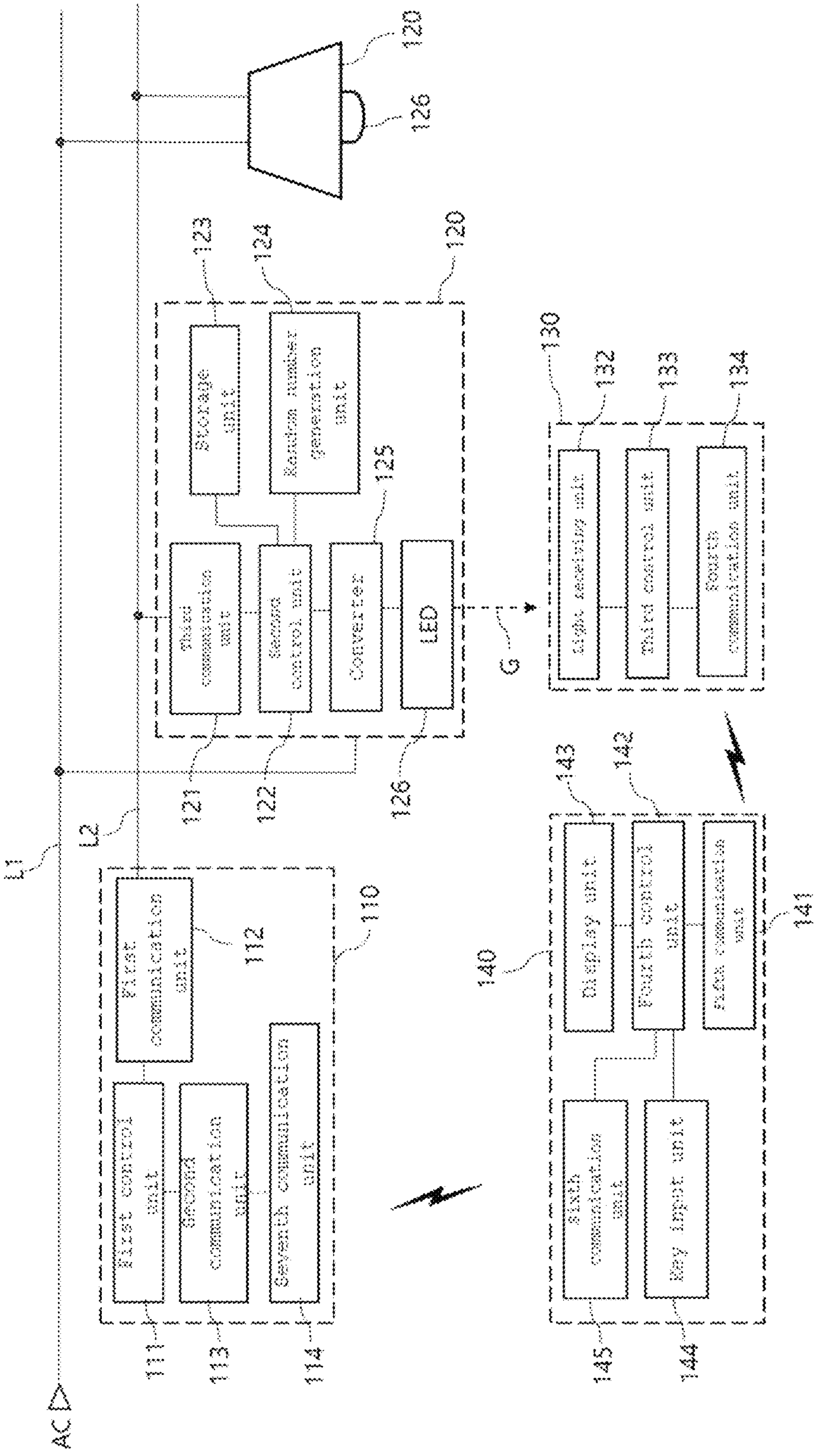
FIG. 2 is a detailed circuit block diagram of FIG. 1.

FIG. 1 is a configuration diagram of a lighting address configuration system using visible light communication according to an embodiment of the present disclosure. FIG. 2 is a detailed circuit block diagram of FIG. 1.

As illustrated in the drawings, the lighting address configuration system using visible light communication in the present disclosure includes a lighting control unit 110, lighting lamp units 120, a visible light receiving device 130, and an address configuration device 140.

The lighting control unit 110 and at least one lighting lamp unit 120 are connected to a power line L1 and a communication line L2. The visible light receiving device 130 may be located below the at least one lighting lamp unit 120. The address configuration device 140 is configured to communicate with the lighting control unit 110 and the visible light receiving device 130.

The present disclosure may be applied to not only a lighting control system using wired communication such as a digital addressable lighting interface (DALI), but also a lighting control system using a power line communication (PLC) or a lighting control system using wireless communication. Operational effects obtained therefrom are identical to each other.

The lighting control unit 110 relays and transmits various command signals for address configuration (hereinafter referred to as 'address configuration commands') received from the address configuration device 140 to the at least one lighting lamp unit 120.

The lighting control unit 110 includes a first control unit 111 configured to individually control lighting of the at least one lighting lamp unit 120, and relay and control an address configuration command, a first communication unit 112 configured to transmit the address configuration command to the at least one lighting lamp unit 120 according to control by the first control unit 111, and a second communication unit 113 configured to input the address configuration command received from the address configuration device 140 to the first control unit 111.

The address configuration commands include a first command, a second command, a third command, and a fourth command, the first command requesting the at least one lighting lamp unit 120 to perform a blinking operation corresponding to parameter calibration data by transmitting information needed to set a parameter, the second command requesting to perform a blinking operation corresponding to address values currently configured for all the lighting lamp unit 120, the third command requesting all the lighting lamp units 120 to generate a random number and perform a blinking operation corresponding to the generated random number, and the fourth command for designate a particular random number that is received and requesting to configure a particular address for a lighting lamp unit 120 which issued the particular random number.

In addition, the address configuration command may further include a fifth command for designating a lighting lamp unit 120 having a particular address to generate a random number and requesting the lighting lamp unit 120 to perform a blinking operation corresponding to the random number.

A seventh communication unit 114 capable of performing wired or wireless connection may be installed in a second communication unit 115 of the lighting control unit 110. The seventh communication unit 114 may be configured to receive an address configuration command transmitted from the address configuration device 140 and transmit the address configuration command to the second communication unit 113 of the lighting control unit 111.

The lighting lamp unit 120 performs a certain blinking operation to configure an address, and flickering of visible light G which occurs during the blinking operation generates a signal having a pattern.

The lighting lamp unit 120 receives the address configuration command from the lighting control unit 110 and performs control corresponding to the address configuration command.

That is, among the address configuration commands, when the first command is received, a blinking operation corresponding to parameter calibration data is performed by reflecting parameter setting information. When the second command is received, a blinking operation corresponding to a currently configured address value is performed. When the third command is received, a random number is generated and a blinking operation corresponding to the generated random number is performed. When the fourth command is received, it is determined whether a designated random number is a random number issued by the lighting lamp unit 120 and, when the designated random number is the random number issued by the lighting lamp unit 120, an operation of configuring a particular input address as an address of the lighting lamp unit 120 is performed.

Additionally, when the fifth command is received, it is determined whether a designated address is identical to an address the lighting lamp unit 120 which is already configured. If the designated address is identical to the address of the lighting lamp unit 120, a random number is generated and a blinking operation corresponding to the random number is performed.

Depending on a type of the lighting lamp unit 120, light-on characteristics when being turned on is different from light-off characteristics when being turned off. Thus, time for keeping light turned on and time for keeping light turned off need to be variably set (hereinafter referred to as 'parameter setting') to increase a recognition rate of communication using the visible light G.

Figure 3:
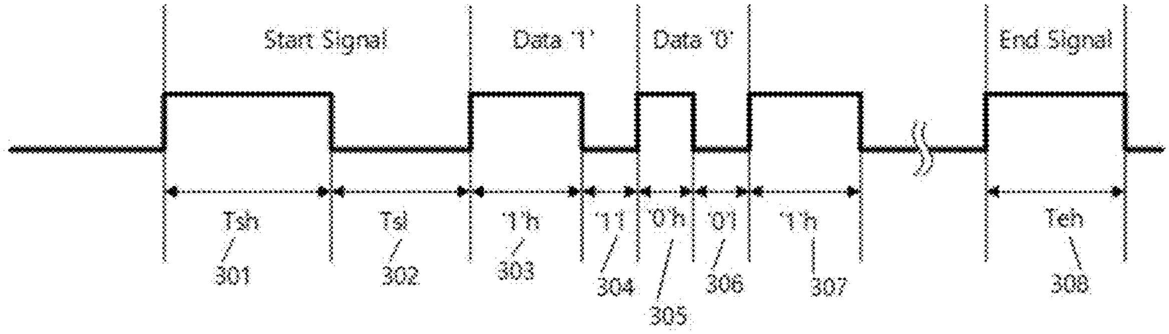
FIG. 3 is a configuration diagram of a parameter signal pattern during a blinking operation of a lighting lamp unit according to the present disclosure.

As shown in a signal pattern of FIG. 3, a parameter needed when the lighting lamp unit 120 performs a blinking operation may be a length 301 of a start bit light-on section, a length 302 of a start bit light-off section, a length 303 of a light-on section when data is '1,' a length 304 of a light-off section when the data is '1,' a length 305 of a light-on section when the data is '0,' a length of a light-off section when the data is '0,' and a length of a light-on section of an end bit section. However, the parameter is not limited thereto.

The lighting lamp unit 120 includes a third communication unit 121 configured to receive an address configuration command transmitted from the lighting control unit 110, a second control unit 122 configured to perform control corresponding to an address configuration command input through the third communication unit 121, a storage unit 123 configured to temporarily store a random number or store an address, a random number generation unit 124 configured to issue a random number upon request by the second control unit 122, a converter 125 configured to convert input power, and an light-emitting diode (LED) 126 configured to generate and emit the visible light G to the visible light receiving device 130.

The converter 125 and the LED 126 operate as general LED lighting devices when address configuration manipulation is not performed.

Here, when the first command is input from the lighting control unit 110, the second control unit 122 controls the LED 126 through the converter 125 to perform a blinking operation corresponding to calibration data according to parameter setting.

Additionally, when the second command is input, a blinking signal is output to the LED 126 to perform a blinking operation corresponding to a currently configured address value.

In addition, when the third command is input, a random number is generated and a blinking signal is output to the LED 126 to perform a blinking operation corresponding to the generated random number.

In addition, when the fourth command is input, it is determined whether a designated random number corresponds to a random number temporarily stored in the storage unit 123, and when the designated random number corresponds to the random number temporarily stored in the storage unit 123, a particular (newly provided) input address is configured as an address of the lighting lamp unit 120 and stored in the storage unit 123.

In addition, when the fifth command is input, it is determined whether a designated address corresponds to the address of the lighting lamp unit 120, which is stored in the storage unit 123, and when the designated address corresponds to the address of the lighting lamp unit 120, a random number is generated through the random number generation unit 124 and control the LED 126 to perform a blinking operation corresponding to the generated random number.

Meanwhile, in generating a random number through the random number generation unit 124, it is logically very difficult to issue another random number, when an initial condition is mathematically the same.

Therefore, in the present disclosure, an almost perfect random number may be easily obtained by generating a number having a certain length by combining lowest-order digits, by noting that, in such a case that an analog value such as a length of a certain section or a voltage is converted into a digital value, when a conversion resolution is at a certain level or higher, a lowest-order digit of a value obtained by the conversion is changed each time the value is read.

The visible light receiving device 130 is a movable portable device, and may be located near and below a desired lighting lamp unit 120, and configured to receive the visible light G which is a blinking signal of the LED 126 and corresponds to a current address or random number, signal-process the visible light G, and transmit the signal-processed visible light G to an address transmission device 140.

Before the blinking signal for the visible light G is received, an operation mode of the visible light receiving device 130 is set in advance by a command from the address configuration device 140.

Accordingly, the visible light receiving device 13 may recognize information (a current address or random number) to be transmitted from the lighting lamp unit 120, and determine normal reception or a communication error based on the recognized information and transmit received information or error information to the address configuration device 140.

The operation mode set for the visible light receiving device 130 in advance by the address configuration device 140 includes a calibration data receiving mode for receiving calibration data, an address receiving mode for receiving an address at which the lighting lamp unit 120 blinks, and a random number receiving mode for receiving a random number.

The visible light receiving device 130 includes a waveguide 131 configured to, when located near to a lighting lamp unit 120, receive only a blinking signal of the corresponding lighting lamp unit 120 and block light from other lighting lamp units 120, a light receiving unit 132 configured to receive the visible light G introduced into the waveguide 131 and input the received visible light G to a third control unit 133, and the third control unit 133 configured to receive an input of a signal of the visible light G through the light receiving unit 132 and transmit the signal of the visible light G to the address configuration device 140 via a fourth communication unit 134.

Here, when set to the address reception mode, the third control unit 133 receives data corresponding to a length of an address, and notifies a received address to the address configuration device 140 when the data is normally received, and notifies occurrence of an error to the address configuration device 140 when the received data is different from a set value. Likewise, in the random number receiving mode or the calibration data receiving mode, the third control unit 133 transmits a received random number or calibration data to the address configuration device 140 when data is normally received, and transmits error information to the address configuration device 140 when an error has occurred.

When an error is determined, a length of actual blinking is measured according to a value set separately from a value set for a parameter to determine whether communication is successful.

The address configuration device 140 is a movable portable device to communicate with the lighting control unit 110 and the visible light receiving device 130, and may be configured as a smartphone or a dedicated device equipped with an address configuration application.

In addition, the address configuration device 140 and the visible light receiving device 130 may be integrally configured.

As an example, preferably, the address configuration device 140 may communicate with the visible light receiving device 130 via Bluetooth low energy (BLE) communication, and the address configuration device 140 may communicate with the lighting control unit 110 via wireless fidelity (WiFi) communication. However, communication therebetween is not limited thereto, and any wired or wireless communication method may be used.

The address configuration device 140 transmits a command to the visible light receiving device 130 to enter the calibration data receiving mode, the address receiving mode, or the random number receiving mode, and transmits an address configuration command to the lighting control unit 110.

As described above, the address configuration command includes the first to fifth commands. In particular, the fifth command is a command issued to designate a lighting lamp unit 120 having a particular address to generate a random number and perform a blinking operation corresponding to the random number. Thus, during maintenance, a number of lighting lamp units 120 to be maintained may be reduced, such inconvenience that all lighting lamp units 120 unnecessarily perform blinking operations may be prevented, and a probability of duplication of random numbers may be reduced.

In the configuration of an address, when the address configuration device 140 requests all lighting lamp units 120 in correspondence with a current address configured for each of the lighting lamp units 120 to perform a blinking operation, all the lighting lamp units 120 may perform a blinking operation. However, since the visible light receiving device 130 may receive only a blinking signal of a particular lighting lamp unit 120 located in a periphery, the visible light receiving device 130 may only receive an address of a desired lighting lamp unit 120, resultantly.

The address configuration device 140 includes a fifth communication unit 141, a fourth control unit 142, a display unit 143, a key input unit 144, and a sixth communication unit 145, wherein the fifth communication unit 141 is configured to communicate with the visible light receiving device 130 using a wireless or wired communication method including BLE, the fourth control unit 142 is configured to output three operation mode commands to the visible light receiving device 130 and output an address configuration command including the first to fifth commands to the lighting control unit 110 according to an input signal command via the key input unit 144, the display unit 143 is configured to display a screen for configuring an address such as an address configuration application driving screen, etc., the key input unit 144 is configured to perform a key input of an address or a parameter value, and the sixth communication unit 145 configured to communicate with the lighting control unit 110 via wirelessly or wired communication such as WiFi.

Hereinafter, operations and functions of the lighting address configuration system using visible light communication according to the present disclosure are described.

First, to configure an address of the lighting lamp unit 120, the address configuration device 110 performs configuration including communication with the lighting control unit 110 and the visible light receiving device 130.

Figure 4:
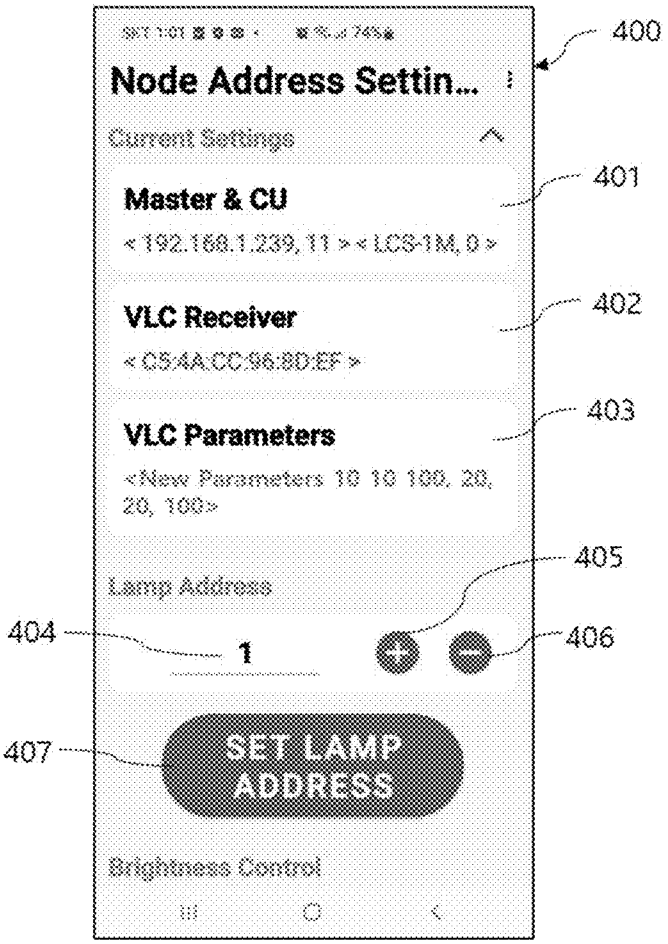
FIG. 4 is a configuration diagram of an address configuration application screen of an address configuration device according to an embodiment of the present disclosure.
Figure 5:
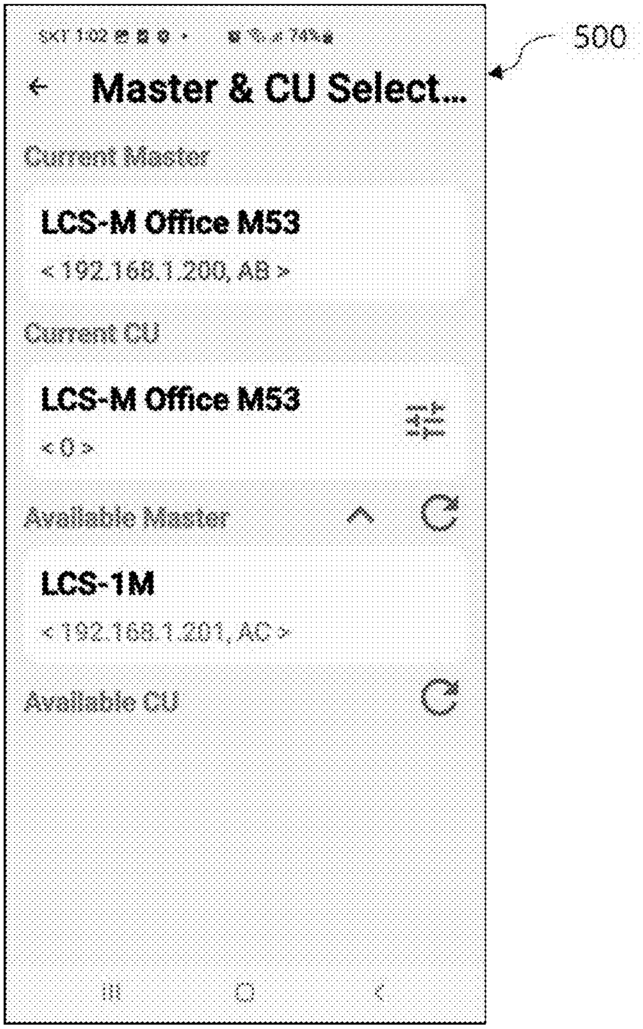
FIG. 5 is a configuration diagram of a screen for selecting a target lighting control unit for configuring an address in the address configuration application screen of FIG. 4.

As an example, an address configuration application screen 400 of FIG. 4 is displayed via the display unit 143 of the address configuration device 140. In the address configuration application screen 400, when a Master & CU item 401 is touched to select a target device for which an address is to be configured, i.e., the lighting control unit 110 and the lighting lamp unit 20, a selection screen 500 of FIG. 5 is displayed in correspondence with the touching. Then, a target device item for configuration is selected from the selection screen 500.

Figure 6:
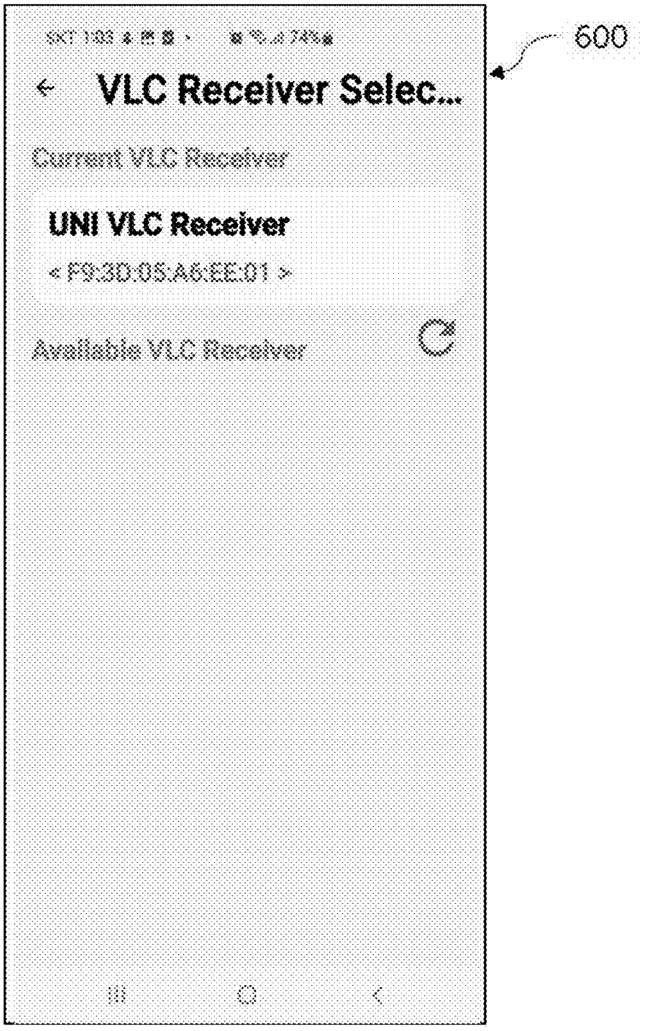
FIG. 6 is a configuration diagram of a screen for selecting a visible light communication device in the address configuration application screen of FIG. 4.

Then, the address configuration application screen 400 of FIG. 4 is restored. When a VLC Receiver item 402 is touched to select the visible light receiving device 130, a visible light receiving device screen 600 of FIG. 6 is displayed, and an item of visible light receiving device 130 is searched for and selected from this screen. At this time, the visible light receiving device 130 needs to be in a state of receiving power.

Figure 7:
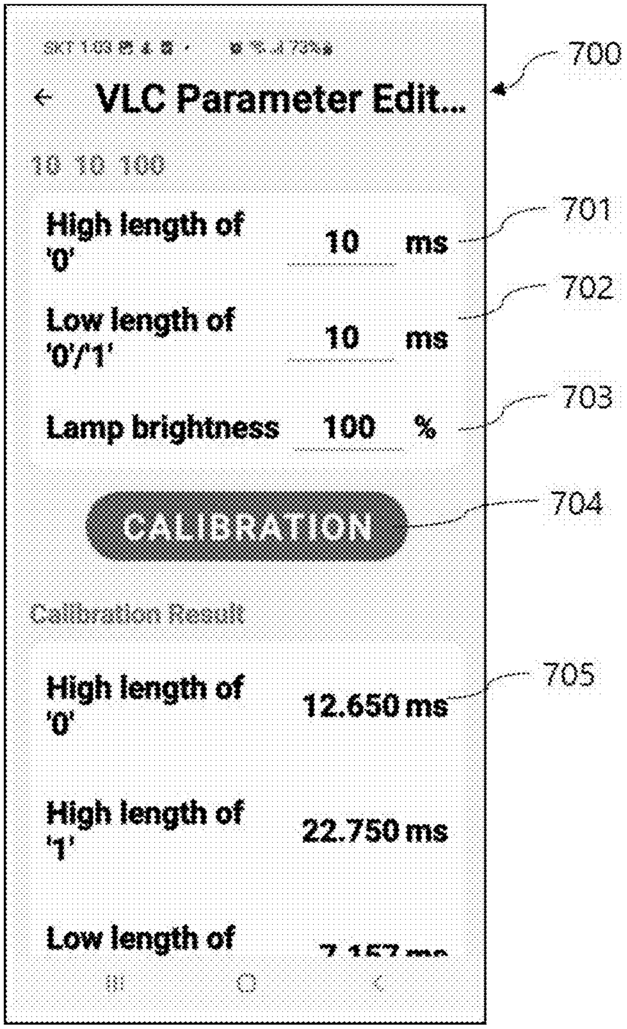
FIG. 7 is a configuration diagram of a parameter setting screen in the address configuration application screen of FIG. 4.

As such, when the configuration of the lighting control unit 110 and the visible light receiving device 120 is completed, the address configuration device 140 returns to the address configuration application screen 400 on the display unit 143 as shown in FIG. 4. When the VLC Parameter item 403 is touched to set a parameter, a parameter setting screen 700 of FIG. 7 is displayed.

In the parameter setting screen 700, various parameters 701 to 703 are set. Then, when the visible light receiving device 130 is located below a lighting lamp unit 120 for which an address is to be configured, and then, the CALIBRATION item 704 (a key input) is touched, the fourth control unit 14 of the address configuration device 140 first transmits a command for switching to the calibration data receiving mode for receiving calibration data to the visible light receiving device 130 via the fifth communication unit 141. Then, the fourth control unit 14 transmits a first command for transmitting parameter values for all the lighting lamp units 120 to the lighting control unit 110 via the sixth communication unit 145 to perform a blinking operation for particular values committed as a value corresponding to the parameter values.

Here, a particular committed value may be preferably a value in which '0' and '1' are repeated to easily determine each value during data communication.

All lighting lamp units 120 that have received the first command blink the LED 126 according to a designated parameter value, and the visible light receiving device 130 receives a signal of the blinking of the LED 126 of the lighting lamp unit 120, and transmits a result of the receiving to the address configuration device 140.

The address configuration device 140 displays information of the result received d from the visible light receiving device 130 on a result item 705 of the display unit 143.

Here, as an example, a length of a light-on section when '0' is transmitted is set to 10 mSec. However, it may be understood that a length of actually measured light-on time is 12.65 mSec, and characteristics of the light-on time vary depending on a lighting lamp unit 120. Thus, subsequent communication data is determined with reference to a value of the measurement performed here.

Therefore, the calibration data is an important particular feature for very accurately determining a blinking signal of the lighting lamp unit 130.

Then, to actually configure an address, an increase key 405 and a decrease key 406 for address configuration values are touched on the address configuration application screen 400 of FIG. 4 to configure a desired address, and then, a SET LAMP ADDRESS item 407 is touched.

When the SET LAMP ADDRESS item 407 is input via the key input unit 144, the fourth control unit 142 of the address configuration device 140 transmits a command for switching to the address receiving mode for receiving an address to the visible light receiving device 130 via the fifth communication unit 141. Then, a second command requesting all the lighting lamp units 120 to perform a blinking operation in correspondence with a currently configured address value is transmitted to the lighting control unit 110 via the sixth communication unit 145.

Accordingly, the lighting lamp unit 120 performs a blinking operation in correspondence with the currently configured address value, and the visible light receiving device 130 receives a signal for the blinking and transmits a result of the reception to the address configuration device 140.

Then, the address configuration device 140 transmits a command for switching to the random number reception mode for receiving a random number back from the visible light receiving device 130, and then, transmits, to the lighting control unit 110, a third command or a fifth command requesting all the lighting lamp units 120 or a lighting lamp unit 120 having a currently configured address that matches a designated address to generate a random number and perform a blinking operation corresponding to the generated random number.

Accordingly, the lighting lamp unit 120 generates a random number through the random number generation unit 124, blinks the LED 126 according to the generated random number, and the visible light receiving device 130 receives a signal for the blinking of the LED 126 of the lighting lamp unit 120, and transmits a result of the receiving to the address configuration device 140.

Then, the address configuration device 140 transmits, to the visible light receiving device 130, a command for switching back to the address receiving mode for receiving the designated address, and then, transmit, to the lighting control unit 110, a fourth command for designating a particular random number that is received and requesting to configure a particular address for a lighting lamp unit 120 which issued the particular random number.

Therefore, after receiving the fourth command transmitted from the lighting control unit 110, the lighting lamp unit 120 configures the designated address as an address of the lighting lamp unit 120 when the lighting lamp unit 120 issued a random number and the received random number matches the random number issued by the lighting lamp unit 120, and then, performs a blinking operation for a value of the address. Then, the visible light receiving device 130 receives a signal for the blinking and transmits a result of the receiving to the address configuration setting device 140.

At this time, the address configuration device 140 determines that the configuration is successful when the address received from the visible light receiving device 130 matches an address requested by the address configuration device 140 to be configured, and then, completes the address configuration.

Although limited embodiments of the present disclosure have been described above, those skilled in the art should note that the present disclosure is not limited thereto, and various embodiments may be expected.

The invention claimed is:

1. A lighting address configuration system using visual light communication, the lighting address configuration system comprising:

a lighting control unit configured to relay and transmit, to a lighting lamp unit, an address configuration command for configurating an address of the lighting lamp unit, the address configuration command being received from an address configuration device;

the lighting lamp unit configured to:

receive the address configuration command from the lighting control unit and perform control corresponding to the address configuration command; and with respect to the address configuration command, perform a blinking operation corresponding to parameter calibration data by reflecting parameter setting information when a first command is received, perform a blinking operation corresponding to a currently configured address value when a second command is received, generate a random number and perform a blinking operation corresponding to the generated random number when a third command is received, and determine whether a designated random number is a random number issued by the lighting lamp unit when the fourth command is received, and when the designated random number is the random number issued by the lighting lamp unit, perform an operation of configuring a particular address input as an address of the lighting lamp unit;

a visible light receiving device configured as a movable portable device, located near and below a desired lighting lamp unit, and configured to receive visible light when the desired lighting lamp unit is blinking, signal-process the visible light, and transmit the signal-processed visible light to an address transmission device; and the address configuration device configured as a movable portable device, configured to communicate with the lighting control unit and the visible light receiving device, transmit a command to the visible light receiving device to enter a calibration data receiving mode, an address receiving mode, or a random number receiving mode, and transmit an address configuration command to the lighting control unit, wherein the address configuration command is controlled to comprise a first command, a second command, a third command, and a fourth command, the first command requesting the lighting lamp unit to perform a blinking operation corresponding to parameter calibration data by transmitting information needed to set a parameter, the second command requesting all lighting lamp units to perform a blinking operation in correspondence with a currently configured address value, the third command requesting all the lighting lamp units to generate a random number and perform a blinking operation in correspondence with the generated random number, and the fourth command requesting to designate a received particular random number and configure a particular address for a lighting lamp unit that issued the received particular random number.

2. The lighting address configuration system of claim 1, wherein the address configuration command further comprises a fifth command for designating a lighting lamp unit having a particular address to generate a random number and perform a blinking operation in correspondence with the random number.

3. The lighting address configuration system of claim 1, wherein a parameter set when the lighting lamp unit performs a blinking operation is a length of a start bit light-on section, a length of a start bit light-off section, a length of a light-on section when data is '1,' a length of a light-off section when data is '1,' a length of a light-on section when data is '0,' a length of a light-off section when data is '0,' and a length of a light-on section in an end-bit section.

4. The lighting address configuration system of claim 1, wherein a random number issued by the lighting lamp unit is generated by, when analog values such as a length of a certain section or a voltage is converted into digital values, combining lowest-order binary digits (0 or 1) of values obtained by the conversion to have a certain length.

5. The lighting address configuration system of claim 1, wherein the visible light receiving device comprises:

a waveguide configured to, when the visible light receiving device is located near and below the lighting lamp unit, receive only a blinking signal of the lighting lamp unit and block light from other lighting lamp units;

a light receiving unit configured to receive visible light introduced into the waveguide and input the received visible light to a third control unit; and a third control unit configured to receive an input of a signal of the visible light through the light receiving unit and transmit the signal of the visible light to the address configuration device through a fourth communication unit, wherein whether communication is successful is determined by measuring a length of actual blinking according to a value set separately from a value set for a parameter.

* * * * *